United States Patent Office 2,983,715
Patented May 9, 1961

2,983,715
RUBBER VULCANIZATION ACCELERATION
Ellis K. Fields, Chicago, Ill., assignor to Standard Oil Company, Chicago, Ill., a corporation of Indiana
No Drawing. Filed Mar. 26, 1958, Ser. No. 723,953
12 Claims. (Cl. 260—79.5)

This invention pertains to the vulcanization of rubber, and more particularly relates to improved vulcanization accelerators.

The object of the present invention is to provide a new and effective class of rubber vulcanization accelerators which produce vulcanizates having improved aging properties.

I have found that effective rubber vulcanization accelerators are amine salts of 2,5-dimercapto-1,3,4-thiadiazole having the general formula

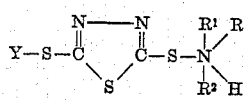

in which Y is hydrogen or the amino radical

in which R is an aliphatic, aromatic or heterocyclic group of from 1 to about 40 carbon atoms and $R^1$ and $R^2$ can be aliphatic, aromatic, or heterocyclic groups containing from about 1 to about 40 carbon atoms, or hydrogen. R, $R^1$, and $R^2$ can be the same or different hydrocarbon or heterocyclic groups.

The amine employed in preparing the amine salt of 2,5-dimercapto-1,3,4-thiadiazole can be an aliphatic or aromatic mono- or polyamine, and can be a primary, secondary or tertiary amine, or can be a basic ring nitrogen compound containing 1 to 40 carbon atoms. The amines can be commercially pure single compounds or can be mixtures of amines. Examples of suitable amines are hexylamine, dibutylamine, octylamine, nonylamine, dodecylamine, hexadecylamine, octadecylamine, cyclohexylamine, n-butylcyclohexylamine, dibenzylamine, furfurylamine, pyridines, quinolines, ethylene diamine, propylene diamine, diethylene triamine, diamylene triamine, triethylene tetramine, diethylene propylene triamine, tetraethylene pentamine, and mixtures of the foregoing. A suitable polyamine product is a crude diethylene triamine containing minor amounts of ethylene diamine and triethylene tetramine. Other suitable aliphatic polyamines include those having the general formula $RNH(CH_2)_3NR_2$, in which R is preferably a $C_{10}$ to $C_{18}$ aliphatic chain, and which are obtained by condensing the suitable amine with acrylonitrile and hydrogenating to the corresponding diamine. Commercially available aliphatic polyamines of this type are those marketed by Armour and Company as "Duomeens," which are prepared by the condensation of a dodecyl (Coco) amine or an octadecyl (tallow) amine with acrylonitrile followed by hydrogenation to the corresponding diamine product; these products are marketed as "Duomeen C" and "Duomeen T," respectively. I may also employ aromatic polyamines, such as for example, phenylenediamine, and aliphatic amines, preferably those containing at least 8 carbon atoms in the alkyl group.

Other suitable amines are tertiary-alkyl primary amines with highly branched alkyl chains in which the primary amino nitrogen is directly attached to a tertiary carbon atom. Examples of such amines are t-butylamine

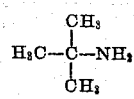

t-octylamine

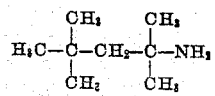

"Primene 81-R," a mixture consisting principally of t-$C_{12}H_{25}NH_2$ to t-$C_{15}H_{31}NH_2$ (molecular weight 185–227 principally), and "Primene JM-T" a mixture consisting principally of t-$C_{18}H_{37}NH_2$ to t-$C_{24}H_{49}NH_2$ (molecular weight 269–353, principally). "Primene 81-R" and "Primene JM-T" are marketed by Rohm and Haas Company.

The amines may be chemically pure products or of a commercial quality. I have found as a desirable aliphatic amine, the amine residue obtained in the following process. Fatty acids, derived from natural fatty acid glycerides, are converted into nitriles and the nitriles are reduced, principally, to primary amines, at temperatures below 150° C. and under alkaline conditions. The reaction mass is then distilled, leaving a residue comprising essentially 10–25% primary amines and 30–60% secondary amines. Depending upon the fatty acid employed, the aliphatic amines usually contain from about 8 to about 18 carbon atoms. Suitable amines residues are the products manufactured according to this general procedure and sold by Armour and Company under the tradename, "Armeen Residues." These residues are obtained as distillation residues in the manufacture of products sold by Armour and Company under the tradenames "Armeen CD," "Armeen SD," "Armeen 8D," "Armeen 12D," "Armeen 18D," etc. "Armeen CD" and "Armeen SD" are mixtures of primary amines prepared from coconut oil and soy bean oil, respectively, and other "Armeens" are mixtures of primary amines containing predominantly the number of carbon atoms specified in the tradename.

The amine salts of 2,5-dimercapto-1,3,4-thiadiazole can be readily prepared by stirring and heating a mixture of the dimercaptothiadiazole and the amine at 60–150° C. for 5 minutes to 2 hours until a homogeneous product is obtained. The molar proportions of amine to thiadiazole can be 1:1 to 2:1, although the proportions up to to 2:1 can be used. Solvents such as benzene, alcohol, ether, or dioxane can be used although generally they are not necessary.

The preparation of the amine salts is illustrated by the following examples:

EXAMPLE I

A mixture of 50 grams (0.1 mole) of a mixture of secondary $C_{16}$ and $C_{18}$ aliphatic amines (marketed by Armour and Company as "Armeen 2HT"), and 7.5 grams (0.05 mole) 2,5-dimercapto-1,3,4-thiadiazole was stirred at 110°–130° C. for about one hour until a clear liquid was obtained having a sulfur content of 8.30% and a nitrogen content of 4.71%. Calculated for $C_{70}H_{142}N_4S_3$—sulfur=8.47% and N=4.9%

EXAMPLE II

A mixture of 60 grams (0.4 mole) 4 n-amyl pyridine and 30 grams (0.2 mole) 2,5-dimercapto-1,3,4-thiadiazole was stirred and heated at 130° C. until a clear solution was obtained. On cooling, a dark yellow crystalline mass having a melting point of 120°–130° C., a sulfur content of 22.1% and a nitrogen content of 12.42% was obtained. Calculated for $C_{22}H_{30}S_3N_4$—sulfur=21.9% and N=12.51%

EXAMPLE III

A mixture of 22.5 grams (0.15 mole) of 2,5-dimercapto-1,3,4-thiadiazole, 40.4 grams (0.15 mole) of "Armeen T" and 30 cubic centimeters ethylene glycol dimethyl ether was stirred at 110° C. till all the solvent had evaporated and a clear liquid product obtained. The resultant product (yield 62 grams) which solidified on cooling contained 8.97% nitrogen and 20.6% sulfur.

The "Armeen T" is a mixture of aliphatic amines marketed by Armour and Company and obtained by converting tallow fatty acids to nitriles and reducing the resulting nitriles at temperatures below 150° C. under alkaline conditions. The reaction mass is then distilled, leaving a residue of principally primary amines.

EXAMPLE IV

A mixture of 15 grams (0.1 mole) of 2,5-dimercapto-1,3,4-thiadiazole, 42.1 grams (0.1 mole) of tallow amine bottoms (3.55% nitrogen and 421 molecular weight) and 30 cubic centimeters ethylene glycol dimethyl ether was stirred at 110° C. until all of the solvent had evaporated and a clear liquid product obtained. The resultant product (yield 57 grams) which solidified on cooling contained 7.37% nitrogen and 17.0% sulfur.

EXAMPLE V

A mixture of 22.5 grams (0.15 mole) 2,5-dimercapto-1,3,4-thiadiazole, 40.4 grams (0.15 mole) of a mixture of tertiary alkyl amines, principally $C_{18}$—$C_{24}$ carbon atoms (marketed by Rohm and Haas as "Primene JM-T") and 30 cubic centimeters of ethylene glycol dimethyl ether was stirred at 110° C. until all of the solvent had evaporated. Sixty-two grams of a clear yellow viscous liquid product which contained 9.13% nitrogen and 21.7% sulfur was obtained.

EXAMPLE VI

A mixture of 7.5 grams (0.05 mole) 2,5-dimercapto-1,3,4-thiadiazole and 23.5 ml. (19.1 grams, 0.1 mole) "Primene 81–R" (principally $C_{18}$—$C_{24}$ carbon atoms) was stirred at 100° C. for 15 minutes. All the solid disappeared as it reacted. The product, 26.6 grams (100% yield), was a bright yellow liquid which solidified on cooling to a yellow solid melting at 80–87° C. *Analysis.*—Calculated for $C_{26}H_{36}N_4S_3$: N, 10.72%; S, 18.03%. Found: N, 10.66%; S, 18.10%.

EXAMPLE VII

A mixture of 7.5 grams (0.05 mole) 2,5-dimercapto-1,3,4-thiadiazole and 26.9 grams (0.1 mole) n-octadecylamine was stirred and heated at 130° C. After 30 minutes a clear yellow liquid resulted which solidified on cooling. On crystallization from n-heptane there resulted 33.7 grams (98%) white crystals melting at 115–116° C. *Analysis.*—Calculated for $C_{38}H_{80}N_4S_3$: N, 7.11%; S, 12.18%. Found: N, 7.29%; S, 11.97%.

EXAMPLE VIII

A mixture of 14.7 grams (0.1 mole) 4-n-amyl pyridine and 15 grams (0.1 mole) 2,5-dimercapto-1,3,4-thiadiazole was stirred at 145° C. for 1 hour, giving a yellow liquid which solidified on cooling. Crystallization from benzene gave 28.5 grams (96%) white crystals melting at 134° C. *Analysis.*—Calculated for $C_{12}H_{15}N_3S_3$: N, 14.05%; S, 32.10%. Found: N, 13.84%; S, 32.30%.

The vulcanization accelerators of the present invention can be used singly or in admixtures with each other, to vulcanize natural rubber, synthetic rubbers and other vulcanizable organic materials such as balate, gutta percha and the like which are susceptible to vulcanization when heated with from 1% to about 5% sulfur. The accelerators of this invention used in amounts of from about 0.1% to about 3%, based on the rubber in the composition, can be employed together with other materials such as antioxidants, retarders, softeners, fillers, etc.

To demonstrate the effectiveness of the herein described vulcanization accelerators, a GR–S rubber (a butadiene-styrene copolymer) was blended in a standard formula as follows:

| | Parts by weight |
|---|---|
| GR–S | 100 |
| Philblack 0 (carbon) | 50 |
| Zinc oxide | 5 |
| Stearic acid | 2 |
| Sulfur | 1.75 |
| Antioxidant ("Betanox Special" [1]) | 1 |

[1] A ketone-amine condensation product marketed by Naugatuck Chemical.

To the above formulation was added 1.75 parts of the amine salt of 2,5-dimercapto-1,3,4-thiadiazole of Example VI; this formulation is identified as Formula No. 1 in the tabulation below. For comparison, to the same basic formula, in place of the accelerator of the present invention was added 1.75 parts 2,2'-dithiobisbenzothiazole (Formula 2), 2-mercapto-benzothiazole (Formula 3) and N-cyclohexyl-2-benzothiazole-sulfenamide (Formula 4). The latter three compounds are commercial vulcanization accelerators in common use at present.

The four formulations were cured at 316° F. for 5, 10, 15, 25, 30 and 40 minutes and the physical properties of the vulcanizates determined. The vulcanizates were then aged in an oven at 212° F. for 70 hours and the physical properties thereof again determined.

The data obtained are tabulated in Table I.

Table I

| Formula No. | Cure at 316° F., Minutes | Mod. 200% | Tens., p.s.i. | Percent Elong. | Hard. | Lbs. Tear. |
|---|---|---|---|---|---|---|
| 1 | 5 | 134 | 530 | 975 | 50 | 153 |
|   | 10 | 255 | 2,420 | 825 | 55 | 390 |
|   | 15 | 388 | 2,740 | 630 | 57 | 454 |
|   | 25 | 568 | 3,370 | 595 | 60 | 312 |
|   | 30 | 620 | 3,445 | 580 | 60 | 310 |
|   | 40 | 750 | 3,330 | 510 | 60 | 256 |
| 2 | 5 | 153 | 1,260 | 925 | 54 | 317 |
|   | 10 | 320 | 3,155 | 715 | 55 | 423 |
|   | 15 | 497 | 3,265 | 515 | 57 | 321 |
|   | 25 | 715 | 3,305 | 480 | 60 | 312 |
|   | 30 | 790 | 3,390 | 470 | 60 | 305 |
|   | 40 | 830 | 2,950 | 400 | 62 | 305 |
| 3 | 5 | 161 | 1,255 | 900 | 54 | 310 |
|   | 10 | 400 | 2,850 | 610 | 58 | 435 |
|   | 15 | 555 | 3,090 | 520 | 59 | 333 |
|   | 25 | 820 | 3,100 | 440 | 60 | 322 |
|   | 30 | 850 | 3,100 | 430 | 62 | 310 |
|   | 40 | 890 | 3,100 | 425 | 62 | 287 |
| 4 | 5 | 247 | 1,720 | 710 | 55 | 388 |
|   | 10 | 800 | 3,075 | 450 | 61 | 252 |
|   | 15 | 870 | 3,185 | 405 | 63 | 245 |
|   | 25 | 945 | 3,190 | 390 | 63 | 242 |
|   | 30 | 1,005 | 3,280 | 380 | 64 | 246 |
|   | 40 | 1,005 | 3,360 | 440 | 65 | 255 |
| OVEN AGED 70 HOURS AT 212° F. | | | | | | |
| 1 | 5 | 1,030 | 2,085 | 320 | 65 | 466 |
|   | 10 | 1,395 | 2,460 | 320 | 67 | 272 |
|   | 15 | 1,645 | 3,250 | 340 | 68 | 224 |
|   | 25 | 1,860 | 3,070 | 285 | 69 | 224 |
|   | 30 | 1,870 | 3,070 | 285 | 69 | 226 |
|   | 40 | 1,870 | 3,090 | 310 | 70 | 228 |
| 2 | 5 | 700 | 1,800 | 380 | 60 | 452 |
|   | 10 | 1,430 | 1,825 | 235 | 65 | 260 |
|   | 15 | 1,505 | 2,020 | 240 | 65 | 241 |
|   | 25 | 1,550 | 2,450 | 245 | 67 | 212 |
|   | 30 | 1,550 | 2,910 | 260 | 67 | 208 |
|   | 40 | 1,645 | 2,550 | 260 | 68 | 203 |
| 3 | 5 | 935 | 2,80 | 320 | 63 | 378 |
|   | 10 | 1,630 | 2,295 | 235 | 66 | 263 |
|   | 15 | 1,910 | 2,375 | 220 | 68 | 244 |
|   | 25 | 1,985 | 2,440 | 225 | 69 | 233 |
|   | 30 | 1,840 | 2,300 | 220 | 70 | 204 |
|   | 40 | 1,840 | 2,215 | 225 | 70 | 177 |
| 4 | 5 | | 1,770 | 170 | 65 | 335 |
|   | 10 | | 2,240 | 175 | 67 | 303 |
|   | 15 | | 2,190 | 165 | 68 | 192 |
|   | 25 | | 2,240 | 175 | 69 | 170 |
|   | 30 | 2,005 | 2,430 | 220 | 69 | 164 |
|   | 40 | 2,385 | 2,700 | 235 | 70 | 160 |

In the table, above, the various column headings have the following meanings:

"Mod. 200%"—The value of the load in pounds per square inch of original cross-section area of sample to give an elongation of 200%.

"Tens. p.s.i."—The pounds per square inch of original cross-section when the test piece of rubber breaks at an elongation of 20 inches per minute speed.

"Percent elong."—The percentage of elongation of the test piece at breaking point.

"Hard."—A measure of the hardness of the rubber in resisting the indentation of its surface by a cone.

"Lbs. tear"—Pounds of force which must be applied to a notched piece of rubber to tear it apart.

The first three tests were conducted on a Scott Testing Machine Model 6 according to ASTM D-412-51T; hardness was measured by a Shore Durameter Type A, according to ASTM D-314-52T; and the tear test was made according to ASTM D-624-48. All of the ASTM tests are fully described in ASTM Standards on Rubber Products.

Percentages given herein and in the appended claims are weight percentages, unless otherwise stated.

I claim:
1. The method which comprises vulcanizing rubber selected from the group consisting of natural rubber and butadiene-styrene copolymer rubber in the presence of from 1% to about 5%, based on the rubber, of sulfur, and from about 0.1% to about 3%, based on the rubber, of an amine salt of 2,5-dimercapto-1,3,4-thiadiazole having the general formula

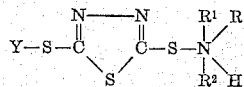

in which Y is selected from the group consisting of hydrogen and the amine radical

in which R is a radical selected from the group consisting of an alkyl radical, and a pyridyl radical, and $R^1$ and $R^2$ are selected from the group consisting of hydrogen, an alkyl radical, and a pyridyl radical, said R, $R^1$ and $R^2$ radicals containing from 1 to about 40 carbon atoms.

2. The method of claim 1 in which the amine salt is an alkyl amine salt.

3. The method of claim 1 in which the amine salt is a dodecyl amine salt.

4. The method of claim 1 in which the amine salt is an octadecylamine salt.

5. The method of claim 1 in which the amine salt is a salt of a mixture of tertiary alkyl amines consisting principally of $t\text{-}C_{12}H_{25}NH_2$ to $t\text{-}C_{15}H_{31}NH_2$.

6. The method of claim 1 in which the amine salt is a 4-n-amyl pyridine salt.

7. An unvulcanized composition containing a predominant amount of a rubber selected from the group consisting of natural rubber and butadiene-styrene copolymer rubber, from about 1% to about 5%, based on the rubber, of sulfur, and from about 0.1% to about 3%, based on the rubber, of an amine salt of 2,5-dimercapto-1,3,4-thiadiazole having the general formula

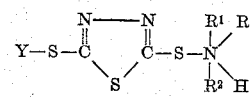

in which Y is selected from the group consisting of hydrogen and the amino radical

in which R is a radical selected from the group consisting of an alkyl radical, and a pyridyl radical, and $R^1$ and $R^2$ are selected from the group consisting of hydrogen, an alkyl radical, and a pyridyl radical, said R, $R^1$, and $R^2$ radicals containing from 1 to about 40 carbon atoms.

8. The composition of claim 7 in which the amine salt is an alykyl amine salt.

9. The composition of claim 7 in which the amine salt is a dodecyl amine salt.

10. The composition of claim 7 in which the amine salt is an octadecylamine salt.

11. The composition of claim 7 in which the amine salt is a salt of a mixture of tertiary alkyl amines consisting principally of $t\text{-}C_{12}H_{25}NH_2$ to $t\text{-}C_{15}H_{31}NH_2$.

12. The composition of claim 7 in which the amine salt is a 4-n-amyl pyridine salt.

References Cited in the file of this patent

UNITED STATES PATENTS

| | | |
|---|---|---|
| 2,331,749 | Watt | Oct. 12, 1943 |
| 2,677,690 | Goshorn et al. | May 4, 1954 |
| 2,766,223 | Goshorn et al. | Oct. 9, 1956 |

FOREIGN PATENTS

| | | |
|---|---|---|
| 1,080,186 | France | Dec. 7, 1954 |
| 750,907 | Great Britain | June 20, 1956 |
| 541,258 | Canada | May 21, 1957 |

UNITED STATES PATENT OFFICE
CERTIFICATION OF CORRECTION

Patent No. 2,983,715                                        May 9, 1961

Ellis K. Fields

It is hereby certified that error appears in the above numbered patent requiring correction and that the said Letters Patent should read as corrected below.

Column 1, line 59, the formula should appear as shown below instead of as in the patent:

$$RNH(CH_2)_3NH_2$$

column 4, Table I, fourth column thereof, below the title "OVEN AGED 70 HOURS AT 212° F.", thirteenth item, for "2, 80" read -- 2,280 --.

Signed and sealed this 3rd day of October 1961.

(SEAL)
Attest:

ERNEST W. SWIDER                          DAVID L. LADD
Attesting Officer                      Commissioner of Patents